Patented Aug. 25, 1953

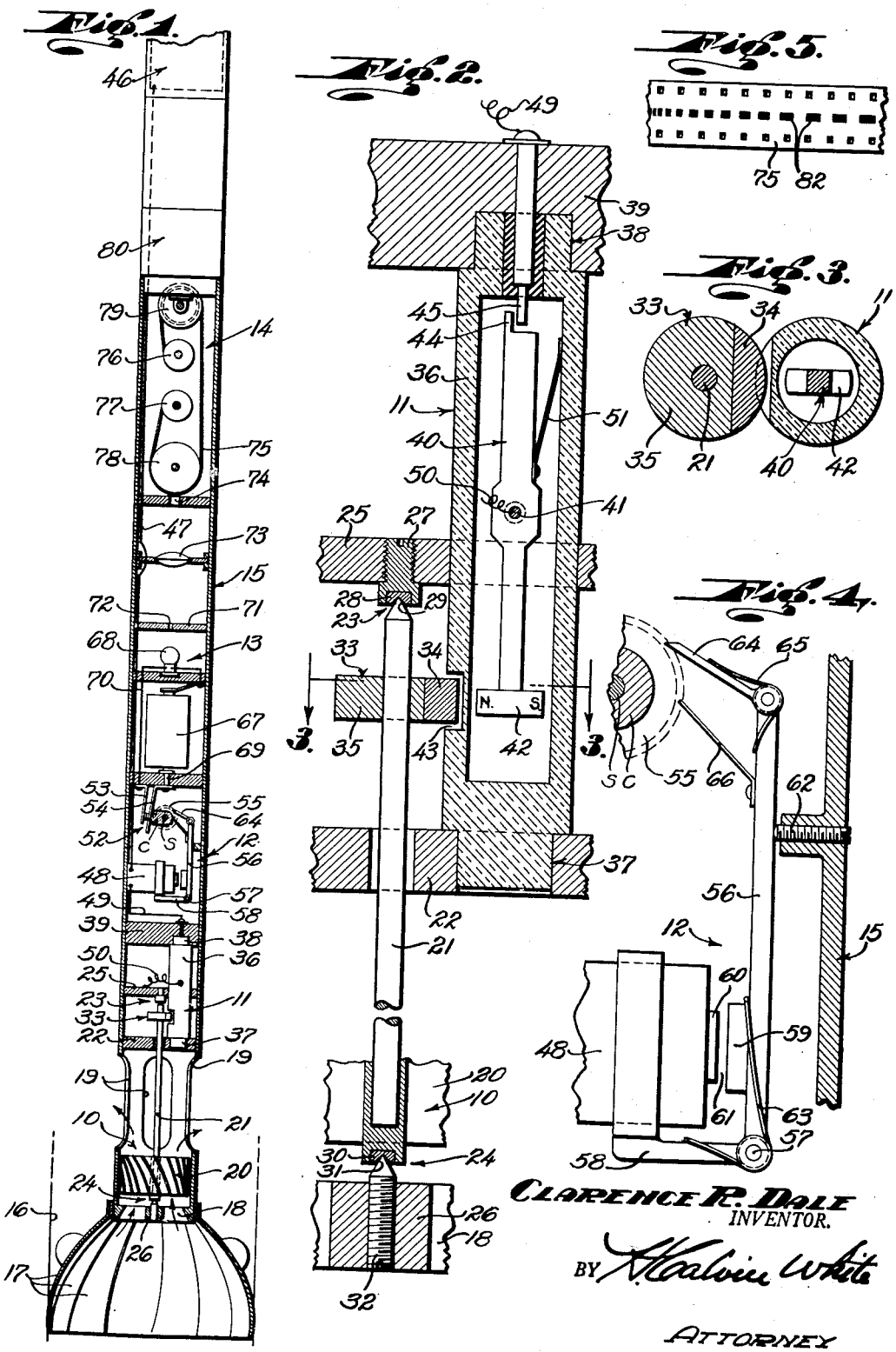

2,649,712

UNITED STATES PATENT OFFICE 2,649,712

OIL WELL FLOWMETER

Clarence R. Dale, Altadena, Calif.

Application October 6, 1947, Serial No. 778,053

2 Claims. (Cl. 73—155)

This invention has to do with the determination or indication of liquid flow rates in wells, including relative flow rates at different elevations in the well, as may be important for any of various purposes including determination of locations of fluid entry into the well as evidenced by increased flow rates at such locations.

One of my major objects is to provide a flow recorder characterized by its sensitivity to all appreciable flow velocities, and by its capacity for indicating or recording actual or relative rates with accuracy by reason of the frictionless transmission of energy between the flow responsive element or rotor, and the indicator or recorder proper.

More particularly, the invention contemplates energization of an electrical circuit in accordance with the revolutions of a flow responsive rotor, and utilizing a recorder responsive to the energy changes in such circuit.

In accordance with its preferred form, the invention contemplates accommodation of the recording apparatus in a case or housing to be lowered into the well fluid, the housing containing a rotor exposed to the fluid and responsive to its flow. Recordation of the rotor revolutions is accomplished electrically and photographically by intermittent energization of a circuit, as by way of a magnetically activated switch responsive to the rotor revolutions, to produce correspondingly intermittent illuminations of a light source. The light impulses then are photographically recorded, as by projecting the light on a film contained in the housing and driven at constant speed.

All the various features and objects of the invention, as well as the details of a typical embodiment, will be understood to better advantage from the following description of the accompanying drawing, in which:

Fig. 1 is a general view illustrating the instrument in longitudinal section;

Fig. 2 is a fragmentary enlarged view showing the rotor and associated magnetic switch;

Fig. 3 is a cross-section on line 3—3 of Fig. 2;

Fig. 4 is a fragmentary enlarged view showing the circuit breaker; and

Fig. 5 is an illustration of the form of record produced on the film.

Referring to Fig. 1, the instrument may be described generally as comprising a fluid responsive rotor mechanism 10, a magnetic switch assembly 11 actuated in accordance with the rotor revolutions, a circuit breaker 12 controlled by the magnetic switch to intermittently illuminate a light source 13, the illuminations of which are recorded by the constant speed film mechanism 14.

The several parts of the instrument may be contained within a case or housing 15 adapted to be lowered into the liquid in a well bore designated by the lines 16. As will be understood, the well bore may consist of an uncased hole, or a section of perforated casing or liner. In either instance the location of fluid entry into the well produces an increased upward flow rate at and above such location, so that identification of flow rate differentials in the manner later explained, serves as a means for determining points of fluid entry from the formation.

If desired, the lower end of the housing may carry suitable means for directing or confining substantially all or a portion of upward liquid flow directly against the rotor. Typically, such means may comprise a circular series of radially flexible metal leaves 17 in "iris" relation permitting their relative radial expansive and contractive movements in accordance with the well bore diameter, while directing the fluid flow through openings 18 into the bottom chamber of the housing 15 and then out through the openings 19.

The rotor mechanism 10 comprises a vaned rotor head 20 which may be of any appropriate design rendering the rotor sensitive (i. e. rotatable) in response to very low as well as higher rates of relative upward fluid flow. The rotor head is carried on a shaft 21 extending freely through the housing partition 22 and terminally carried by bearings 23 and 24 supported respectively by the housing walls 25 and 26. The shaft terminal supports are jewel-type bearings characterized by their extremely low frictional resistance to the shaft rotation and capacity for remaining free from obstruction by sand or other particles in the well fluid. The upper bearing consists of an adjustable screw 27 in the head of which is contained a hard bearing material or jewel 28 having a downwardly enlarging or expanding conical recess 29 receiving the pointed shaft end. The lower mounting 24 comprises a bearing or jewel 30 carried by the shaft and having a conical recess 31 receiving the pointed end of an adjustable supporting screw 32. Thus it will be observed that both bearing recesses 29 and 31 open downwardly so that obstructing particles either will not tend to enter the recesses, or will quickly drop out should for any reason they happen to be carried into either bearing. This feature is of obvious importance in assuring complete freedom of the rotor for turning in response to and in accordance with all liquid flow rates.

The shaft 21 carries a magnetic switch operating element which, broadly considered, may be associated with the shaft in any suitable manner capable of producing the hereinafter described intermittent actuations of the switch assembly 11. Typically, the shaft is shown to carry a head 33 which may be in the form of a circular body, one section 34 of which is made of non-magnetic material, while the remaining section 35 is a magnetic material such as iron. Referring to Fig. 3, it will be observed that the magnetic metal 35 occupies a section of the entire body of substantially greater circular extent than the non-magnetic material 34, so that the switch 11 is influenced by the magnetic metal during an interval greater than one-half of a complete revolution of the rotor.

The magnetic switch 11 comprises a fluid tight non-magnetic case 36 terminally supported at 37 and 38 by the walls 22 and 39, the latter serving as a seal closure preventing entry of well fluid to the interior of the housing 15 above. The case 36 contains a switch arm or lever 40 pivoted intermediate its ends on pin 41 and carrying a magnet 42 opposite the external case recess 43 which receives a peripheral portion of the head 33. The upper end 44 of the switch arm is engageable with a conductor terminal 45 to which current is supplied from batteries (not shown) in the upper section 46 of the housing by way of conductor lead 47, relay 48 and lead 49. The arm 40 is grounded by way of wire 50. As illustrated in Fig. 2, the arm 40 normally is maintained in a position disengaging its terminal 44 from the contact 45, by a leaf spring 51 carried by the arm and bearing against the side of the case.

The relay 48 serves to operate the circuit breaker mechanism 12 in response to actuations of the magnetic switch 11. Referring to Fig. 4, the circuit breaker comprises an appropriate relay-actuated pawl and cam mechanism for intermittently closing a switch 52, comprising a pair of resiliently flexible contacts 53 and 54. Shaft S journaled in the case carries a ratchet wheel 55 and a cam C operating upon its rotation with the ratchet wheel and shaft to actuate the switch 52. Typically the pawl mechanism may comprise a lever 56 pivotally carried at 57 by bracket 58 applied to the relay 48, the arm carrying an armature element 59 opposite the relay core 60. Adjustment of the gap at 61 may be effected by set screw 62. Swinging of the arm in response to energization of the relay is resisted by spring 63. The upper end of the arm carries a pawl 64 urged against the ratchet wheel 55 by spring 65, the arm also carrying a spring finger brake 66 which engages and arrests movement of the ratchet wheel between its actuations by the pawl.

Above the circuit breaker the housing contains a battery 67 for illuminating the low wattage lamp 68, the battery engaging conductor 69 and lamp circuit 70 being connected to the switch contacts 53 and 54, as illustrated. Partition 71 contains an aperture 72 through which light from the lamp 68 is transmitted to the lens 73 and thence condensed to be projected through aperture 74 against the film 75. The latter is carried and driven by the conventionally illustrated mechanism 14 which may include the take-up and supply reels 76 and 77, idler 78 and drive sprocket 79 powered by a clock works mechanism contained in section 80 of the housing. As previously indicated, the film may be driven at constant or uniform speed so that the intervals recorded on the film become an indication or measure of the flow rate to which the rotor 10 responds.

In considering the operation of the instrument, assume the rotor to be turning in response to upward fluid flow through the bottom of the housing. As the magnetic metal element 35 rotates opposite the switch magnet 42, the switch arm 40 closes, and remains closed throughout the rotative interval corresponding to the circular extent of the element 35. Each closing of the switch energizes the relay 48, causing arm 56 and its pawl 64 to rotate the ratchet wheel 55 through a predetermined angle. As will be understood, once during each complete revolution of the ratchet wheel, cam C closes switch 52 to illuminate lamp 68 and project a beam of light on film 75, the light being energized during a period corresponding to a predetermined number of rotor revolutions.

The resultant record produced on the developed film appears, see Fig. 5, as a succession of spaced segments or areas 82 corresponding collectively in a given length of the film, to the number of rotor revolutions and therefore fluid flow rate. Knowing the film speed, with proper calibration of the instrument, the liquid flow velocity may be ascertained; or without calibration of the instrument, relative flow velocities at different locations or elevations in the well, may be identified by comparison of the records taken at the different elevations on corresponding lengths of film.

I have previously mentioned that in some instances the well liquid flow may be below a rate at which the rotor is accurately or satisfactorily responsive. The invention contemplates a method of using an instrument of this character whereby flow rate differentials may be indicated or determined, despite the existance at one or more locations of flow rates so low as normally incapable of a relative determination. Under such circumstances, and in accordance with the invention, the instrument may be lowered at a uniform rate within the liquid through the zones being investigated, thus in effect creating a relative liquid velocity to which the rotor is fully responsive. Since the rate of lowering is constant, the resulting base or reference relative liquid flow rate remains constant, and differential actual flow rates at the different locations are determinable on the film record in accordance with their values over and above the created base or reference rate.

I claim:

1. A well flow meter comprising a vertically elongated housing adapted to be suspended in vertical condition and lowered in the well liquid, a rotor in the housing and exposed to the liquid for rotation by and in accordance with the vertical liquid flow relative to the housing, a magnetic switch in said housing sealed from the well liquid, an annular member carried by and rotating with said rotor, said member comprising a non-magnetic segment and a magnetic metal segment operating to actuate said switch in accordance with the rotor revolutions, said magnetic metal segment being of an angular extent greater than 180° to in each instance actuate the switch for an interval corresponding to greater than one-half rotor revolution, and a recorder within said housing above the rotor responsive to the operations of said switch.

2. A well flow meter comprising a vertically elongated housing adapted to be suspended in vertical condition and lowered in the well liquid, a rotor in the housing and exposed to the liquid for rotation about a vertically extending axis by and in accordance with the vertical liquid flow relative to the housing, a first electrical circuit including a magnetic switch in said housing above the liquid contacting portion of the rotor and sealed from the well liquid, a magnetic metal element carried by and rotatable with said rotor to intermittently close said switch, a second electrical circuit including a light source and a circuit breaker both positioned above the rotor, means for actuating said circuit breaker to intermittently illuminate said light source in accordance with the operations of said switch, and means in said housing above the rotor, switch, light source and circuit breaker for driving a film at constant speed to record on said film the intermittent illuminations of said light source.

CLARENCE R. DALE.

References Cited in the file of this patent

UNITED STATES PATENTS

| Number | Name | Date |
|---|---|---|
| 138,657 | Johnson | May 6, 1873 |
| 574,562 | Nash | Jan. 5, 1897 |
| 697,492 | Kelly et al. | Apr. 15, 1902 |
| 1,355,165 | Rasch | Oct. 12, 1920 |
| 1,406,682 | Rathbone | Feb. 14, 1922 |
| 1,413,355 | Price | Apr. 18, 1922 |
| 1,440,778 | Foster | Jan. 2, 1923 |
| 2,047,529 | Turk | July 14, 1936 |
| 2,090,619 | Biach et al. | Aug. 24, 1937 |
| 2,277,898 | Andrew | Mar. 31, 1942 |
| 2,334,920 | Gosline et al. | Nov. 23, 1943 |
| 2,348,192 | Chambers | May 9, 1944 |
| 2,355,047 | Bennett | Aug. 8, 1944 |

FOREIGN PATENTS

| Number | Country | Date |
|---|---|---|
| 323,198 | Great Britain | Dec. 23, 1929 |
| 593,084 | Germany | Feb. 21, 1934 |
| 510,174 | Great Britain | July 17, 1939 |
| 521,412 | Great Britain | May 21, 1940 |